(12) United States Patent
Mandal

(10) Patent No.: US 7,099,810 B2
(45) Date of Patent: Aug. 29, 2006

(54) ACOUSTIC LOGGING TOOL HAVING QUADRUPOLE SOURCE

(75) Inventor: Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 738 days.

(21) Appl. No.: 09/885,332

(22) Filed: Jun. 20, 2001

(65) Prior Publication Data

US 2003/0002388 A1    Jan. 2, 2003

(51) Int. Cl.
- G06G 7/34 (2006.01)
- G01V 1/40 (2006.01)
- G01V 1/16 (2006.01)

(52) U.S. Cl. .............................. 703/8; 367/31; 367/38

(58) Field of Classification Search .................... 703/1, 703/8; 367/31, 38
See application file for complete search history.

(56) References Cited

U.S. PATENT DOCUMENTS

| | | | |
|---|---|---|---|
| 4,562,557 A * | 12/1985 | Parks et al. | 367/27 |
| 4,932,003 A | 6/1990 | Winbow et al. | |
| 5,027,331 A | 6/1991 | Winbow et al. | |
| 5,077,697 A * | 12/1991 | Chang | 367/31 |
| 5,796,677 A * | 8/1998 | Kostek et al. | 367/25 |
| 5,995,477 A * | 11/1999 | Smith et al. | 369/30.42 |
| 6,125,079 A * | 9/2000 | Birchak et al. | 367/35 |
| 6,366,531 B1 | 4/2002 | Varsamis et al. | |
| 6,469,636 B1 | 10/2002 | Baird et al. | |
| 6,552,962 B1 | 4/2003 | Varsamis et al. | |
| 6,614,360 B1 | 9/2003 | Leggett et al. | |
| 2002/0113717 A1 | 8/2002 | Tang et al. | |

OTHER PUBLICATIONS

Batakrishan,M., "Observations and Synthesis of Seismic Waves in Anisotropic Media" 1988. abstract. 2 pages.*

*Underground Sound, Application of Seismic Waves*, J. E. White, Methods in Geochemistry and Geophysics, 18, Elesevier, 1983, pp. 20-35 and 162-193.

*Full-Wave Acoustic Logging: Synthetic Microseismograms and frequency-wavenumber analysis*, D. P. Schmitt et al., Geophysics, vol. 50, No. 11, Nov. 1985, pp. 1756-1778.

Chen, S.T., "Shear-Wave Logging With Quadrupole Sources," Geophysics, May 1999, pp. 590-597, vol. 54 No. 5, Houston, U.S.A.

Chen, S.T. and Eriksen, E.A., "Compressional And Shear-Wave Loggin In Open And Cased Holes using A Multiple Tool," Geophysics, Apr. 1991, pp. 550-557, vol. 56, No. 4, Houston, U.S.A.

Gawin, Adam, "Podstawy Teoretyczne Odwiertowych Profilowan Kwadrupolowych," Acta Geophysica Polonica, 1971, pp. 181-204, vol. XIX, No. 2.

(Continued)

*Primary Examiner*—Paul L. Rodriguez
*Assistant Examiner*—Tom Stevens
(74) *Attorney, Agent, or Firm*—Conley Rose, P.C.

(57) ABSTRACT

An acoustic tool that provides a reduced tool mode and enhanced accuracy for estimating shear wave propagation slowness in slow formations is disclosed. In one embodiment, the acoustic tool comprises: an acoustic source, an array of acoustic receivers, and an internal controller. The acoustic source excites waves that propagate in a quadrupole mode. The internal controller processes signals from the array of acoustic receivers to determine a peak phase semblance having a slowness value that varies with frequency. The minimum slowness value associated with the peak phase semblance provides an accurate estimate of the shear wave propagation slowness. The acoustic source preferably includes four source elements. The elements that are 90° apart are preferably driven in inverse-phase to obtain the quadrupole excitation pattern.

16 Claims, 5 Drawing Sheets

OTHER PUBLICATIONS

Winbow, Graham A., "Compressional And Shear Arrivals In A Multipole Sonic Log," Geophysics, Jul. 1985, pp. 1119-1126, vol. 50, No. 7.

Winbow, Graham A., A theoretical Study Of Acoustic S-Wave and P-Wave Velocity Logging With Conventional And Dipole Sources In Soft Formations, Geophyscis, Oct. 1988, pp. 1334-1342, vol. 53, No. 10.

Kurkjian, Andrew L. and Chang, Shu-Kong, "Acoustic Multipole Sources In Fluid-Filled Boreholes," Geophysics, vol. 51, Jan. 1986, pp. 148-163.

Winbow, G. A., "How To Separate Compressional And Shear Arrivals In A Sonic Log," Exxon Production Research Company, presented at the 50th Annual International Soc. Explor. Geophys. Meeting and Exposition, 1980, pp. 2107-2130.

Winbow, G. A. and Rice, J. A., "Theoretical Performance of Multiple Sonic Logging Tool," 54th Ann. Internat. Mtg. Soc. Explor. Geophys., Expanded Abstracts, 1984, pp. 37-40.

Canadian Patent Application No. 2,390,981, Canadian Office Action mailed Jul. 11, 2005, 2 pages.

* cited by examiner

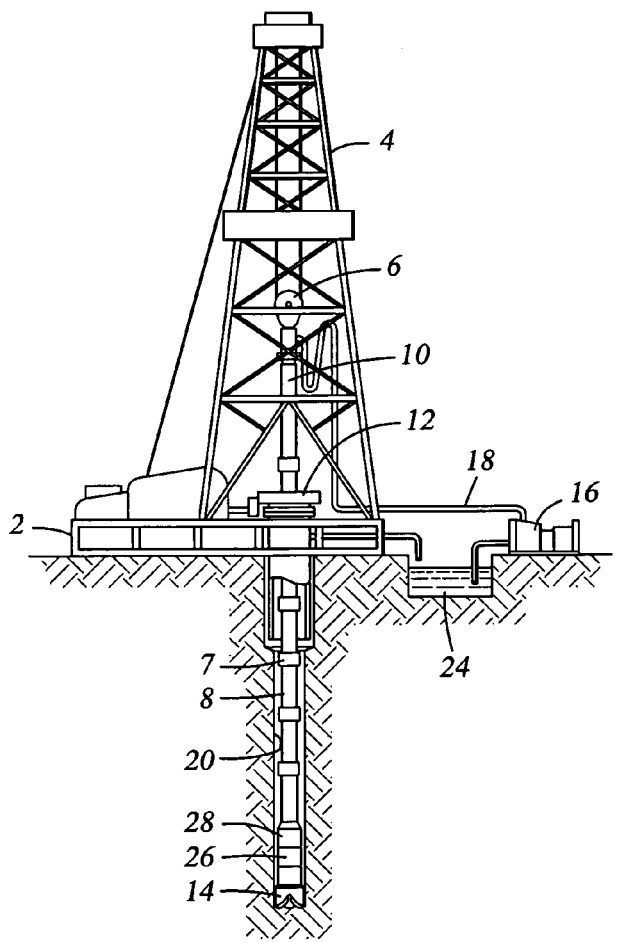
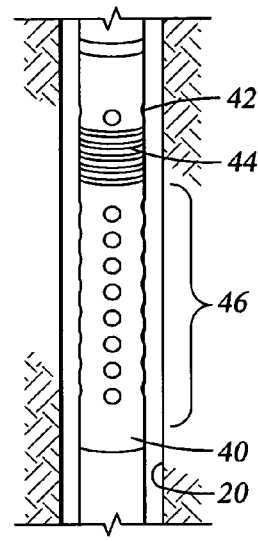
Fig. 2
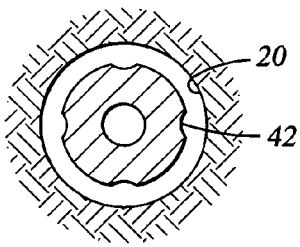
Fig. 3
Fig. 1 (Prior Art)
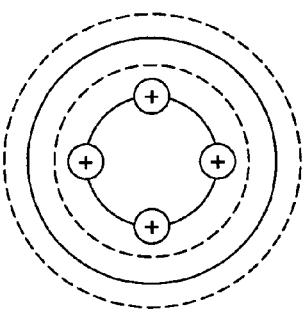
Fig. 4A
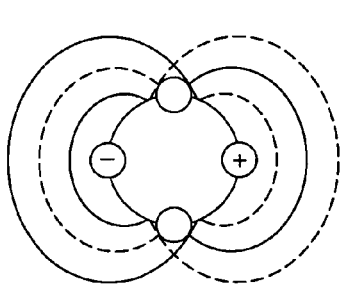
Fig. 4B
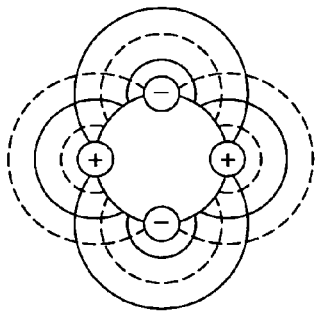
Fig. 4C

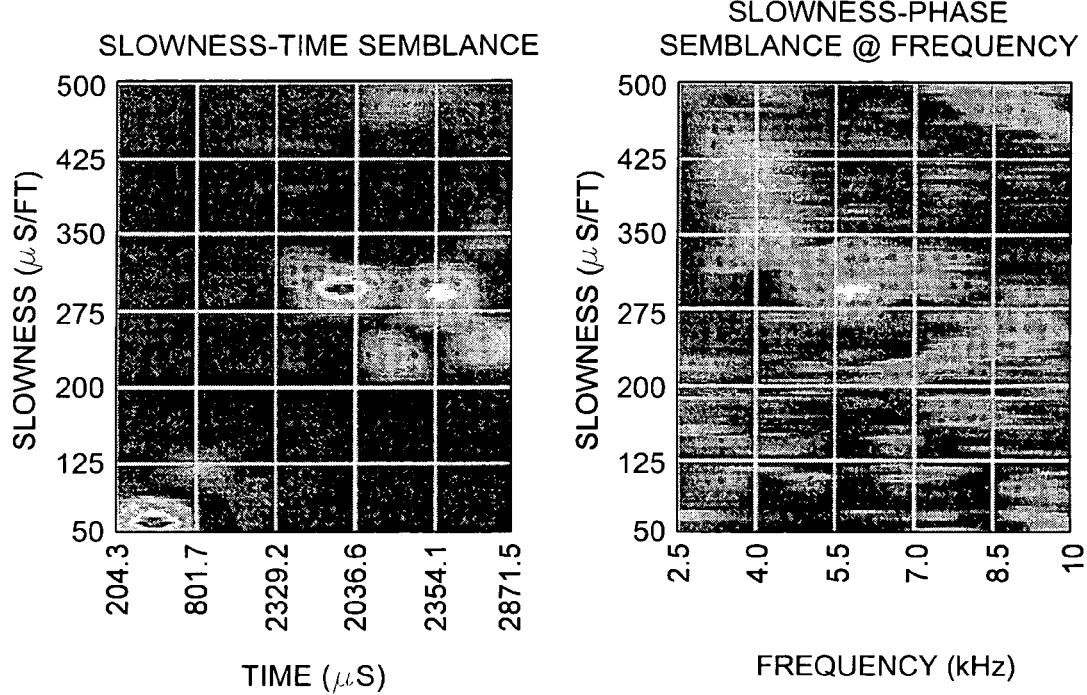
Fig. 5A
Fig. 5C
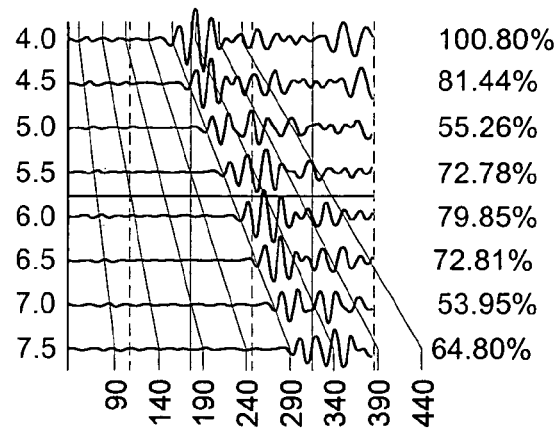
Fig. 5B
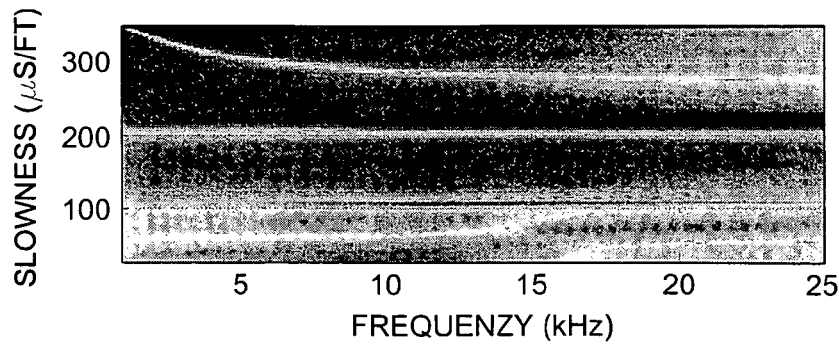
Fig. 5D

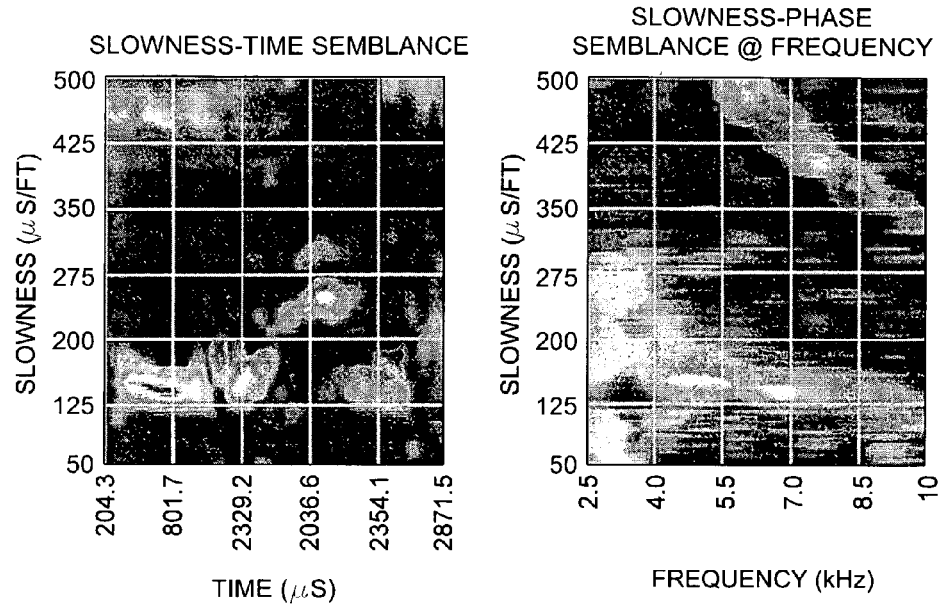
*Fig. 6A*
*Fig. 6C*
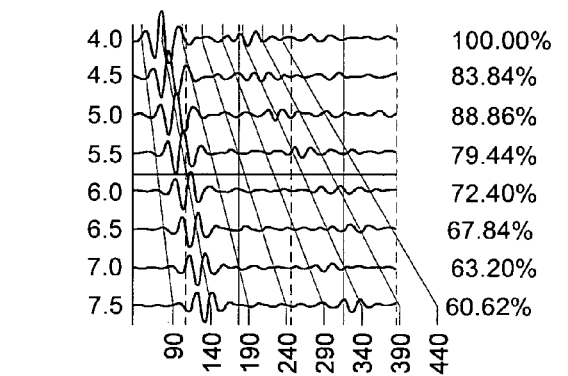
*Fig. 6B*
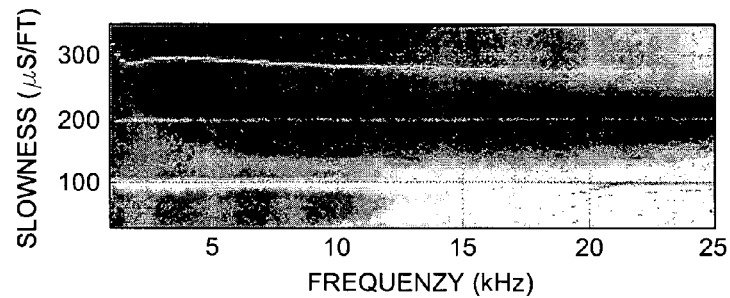
*Fig. 6D*

SLOWNESS-TIME SEMBLANCE

SLOWNESS-PHASE SEMBLANCE @ FREQUENCY

US 7,099,810 B2

ACOUSTIC LOGGING TOOL HAVING QUADRUPOLE SOURCE

BACKGROUND OF THE INVENTION

1. Field of the Invention

The present invention relates generally to systems and methods for determining characteristics of a formation surrounding a borehole. More particularly, the present invention relates to an acoustic logging tool that provides enhanced performance through use of a quadrupole source configuration.

2. Description of Related Art

An acoustic logging tool typically includes an acoustic source (transmitter), and a set of receivers that are spaced several inches or feet apart. An acoustic signal is transmitted by the acoustic source and received at the receivers of the borehole tool which are spaced apart from the acoustic source. Measurements are repeated every few inches as the tool passes along the borehole.

The acoustic signal from source travels through the formation adjacent the borehole to the receiver array, and the arrival times and perhaps other characteristics of the receiver responses are recorded. Typically, compressional wave (P-wave), shear wave (S-wave), and Stoneley wave arrivals and waveforms are detected by the receivers and are processed. The processing of the data is often accomplished uphole or may be processed real time in the tool itself. Regardless, the information that is recorded is typically used to find formation characteristics such as formation slowness (the inverse of acoustic speed), from which pore pressure, porosity, and other formation property determinations can be made. In some tools, the acoustic signals may even be used to image the formation.

Logging-while-drilling (LWD) logging tools are generally located as close to the drill bit as possible, so as to minimize the delay between reaching a formation and measuring its properties. When implemented as LWD tools, acoustic logging tools must overcome a number of obstacles to perform successfully. These obstacles include drilling noise, and acoustic properties of the thick tool body. The drilling operation creates a continuous low-frequency noise that can interfere with acoustic measurements. For the most part, the noise of the drilling operation exists only in a range of frequencies below about 2 kHz. Accordingly, the drilling noise can be effectively screened out in tools designed to operate in higher frequency ranges.

The portion of the drill string near the drill bit is typically designed to withstand the large compressive force created by the weight of the drill string resting on the drill bit. Accordingly, the walls of the tubing in this region is substantially thicker than the average wall thickness of the drill string. The outer-diameter of the tubing is consequently increased, particularly for LWD tools, which have to accommodate the bulk of logging instruments in addition to an inner bore for fluid flow.

In acoustic tools, increasing the rigidity of the tool increases the amplitude of "the tool mode", i.e. the amplitude of the acoustic energy that propagates through the body of the tool between the acoustic source and the receiver array. It is desirable to minimize the tool mode because this energy can interfere with the desired measurements of the true formation shear wave velocity.

Increasing the outer diameter of the tool (relative to the borehole diameter) also increases the dispersion of interface waves. Interface waves are acoustic energy that propagates along the borehole boundary. For soft formations where the shear wave velocity is slower than the borehole fluid sound velocity, the interface wave velocity provides the best measurable indication of the true formation velocity. Dispersion of these waves reduces the measurement accuracy. Accordingly, it is desirable to reduce the dispersion of interface waves.

SUMMARY OF THE INVENTION

Accordingly, there is disclosed herein an acoustic tool that provides a reduced tool mode and enhanced accuracy for estimating shear wave propagation slowness in slow formations. In one embodiment, the acoustic tool comprises: an acoustic source, an array of acoustic receivers, and an internal controller. The acoustic source excites waves that propagate in a quadrupole mode. The internal controller processes signals from the array of acoustic receivers to determine a peak phase semblance having a slowness value that varies with frequency. The minimum slowness value associated with the peak phase semblance provides an accurate estimate of the shear wave propagation slowness. The acoustic source preferably includes four source elements. The elements that are 90° apart are preferably driven in inverse-phase to obtain the quadrupole excitation pattern.

BRIEF DESCRIPTION OF THE DRAWINGS

For a more detailed description of the preferred embodiment of the present invention, reference will now be made to the accompanying drawings, wherein:

FIG. 1 shows a typical logging while drilling environment;

FIG. 2 shows a preferred acoustic logging tool embodiment;

FIG. 3 shows a cross-sectional view of the acoustic source portion of the logging tool;

FIGS. 4A–4C show monopole, dipole, and quadrupole excitation patterns;

FIGS. 5A–5D show simulation results for monopole excitation;

FIGS. 6A–6D show simulation results for dipole excitation;

Figure 7A:
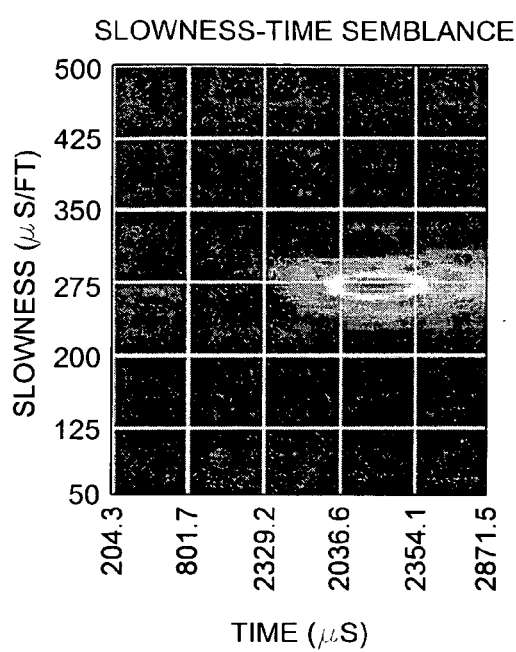
FIGS. 7A–7D show simulation results for quadrupole excitation.
Figure 7C:
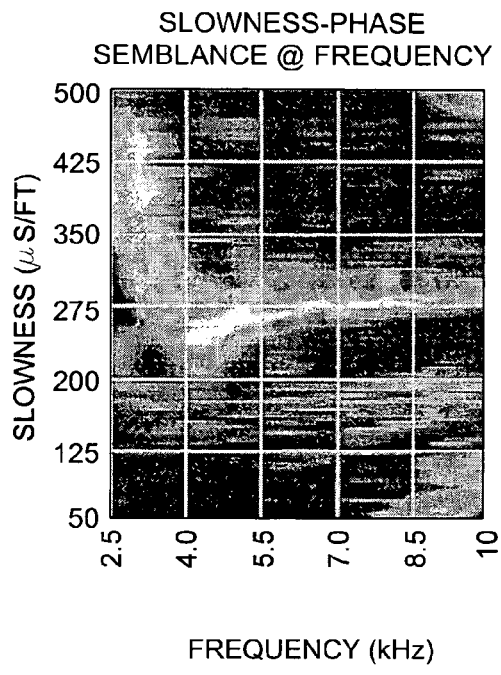

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

It is noted that speed and slowness are inversely related, and the determination of one automatically determines the other. The following discussion focuses on determining wave propagation slowness, but this is recognized to be the equivalent of determining wave propagation speed.

DETAILED DESCRIPTION OF THE PREFERRED EMBODIMENT

Turning now to the figures, FIG. 1 illustrates a typical logging-while-drilling environment. A drilling platform 2 is equipped with a derrick 4 that supports a hoist 6. The drilling is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed "mud", is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In a preferred embodiment, downhole sensors 26 are coupled to a downhole controller/telemetry transmitter 28 that transmits telemetry signals by modulating the mud flow in drill string 8. A telemetry receiver may be coupled to the kelly 10 to receive transmitted telemetry signals. Other telemetry transmission techniques are well known and may be used. One of the sensors 26 is an LWD acoustic tool located near the drill bit 14.

FIG. 2 shows a preferred embodiment of an acoustic LWD tool 40 in a borehole 20. The tool comprises an acoustic source 42, an acoustic isolator 44, and an acoustic receiver array 46. The acoustic isolator 44 serves to attenuate and delay acoustic waves that propagate through the body of the tool from the source 42 to the receiver array 46. Any standard acoustic isolator may be used. The acoustic source 42 and receiver array 46 are preferably made up of piezoelectric elements designed to operate in downhole conditions. However, many other sources and detectors are suitable for downhole operation, and may be used.

The LWD tool 40 preferably includes an internal controller (not specifically shown) that communicates with the downhole controller 28. When the downhole controller 28 enables the operation of the LWD tool 40, the internal controller controls the triggering and timing of the acoustic source 42, and records and processes the signals from the receiver array 46. The internal controller fires the acoustic source 42 periodically, producing acoustic pressure waves that propagate through the fluid in borehole 20 and into the surrounding formation. At the borehole boundary, some of the acoustic energy is converted into shear waves that propagate along the interface between the borehole fluid and the formation. As these "interface waves" propagate past the receiver array 46, they cause pressure variations that can be detected by the receiver array elements. The receiver array signals are processed by the internal controller to determine the true formation shear velocity. The internal controller may then communicate the formation shear velocity to the downhole controller/telemetry transmitter 28 for communication to the surface. Alternatively, the downhole controller may maintain a log of formation shear velocities downhole.

FIG. 3 shows a cross-sectional view of the LWD tool 40. The acoustic source 42 preferably consists of four elements that are equally spaced on the circumference of the tool. The receiver array preferably includes a row of elements spaced axially along the surface of the tool. The receiver array may also include additional rows of elements spaced circumferentially from the first row. In a preferred embodiment, the receiver array consists of four rows of elements that are circumferentially aligned with the four source elements.

The source elements can typically be fired individually and concurrently. When fired concurrently, the elements can be fired in phase and in inverse phase. An in-phase firing means that the same trigger signal is applied simultaneously to the elements. An inverse-phase firing means that as one element receives a trigger signal, another receives an inverted trigger signal, i.e. the additive inverse (negative) of the trigger signal. This firing flexibility allows for variation of the acoustic source excitation pattern.

FIG. 4A shows the four source elements being fired in-phase. This produces a monopole excitation pattern. This monopole pattern is one mode of wave propagation. Other modes of wave propagation are shown in FIG. 4B (dipole) and FIG. 4C (quadrupole). The source produces a dipole excitation pattern if elements on opposite sides of the tool are fired in inverse-phase. A quadrupole excitation pattern is produced when elements 90° apart are fired in inverse phase.

FIGS. 5–7 show simulation results for these three source excitation patterns. The simulations were performed using a concentric symmetric layer model. In these simulations, the formation is assumed to be a typical slow formation, with a compressional wave propagation slowness of 110 µs/ft, and a shear wave propagation slowness of 230 µs/ft. The borehole diameter is assumed to be 8.5 inches. The inner diameter of the tool is 1.9 inches, and the outer diameter is 7.25 inches. The receiver elements are located at half-foot intervals between 4.0 ft and 7.5 ft, inclusive. Full waveform simulation has been done using existing techniques (such as 3D-finite difference numerical modeling).

FIG. 5B shows the simulated signals received by the receiver elements. Each of the waveforms is shown for a corresponding receiver as a function of time since the transmitter firing. (Note the increased time delay before the acoustic wave reaches the increasingly distant receivers.) After recording the waveforms, the logging tool typically normalizes the waveform so that they have the same signal energy. In FIG. 5B, each waveform is labeled with a percentage to indicate the original maximum peak amplitude of the signal relative to the maximum peak amplitude of the first signal.

FIG. 5B also shows a graduated series of sloping lines to indicate the relative waveform delays to be expected for given slowness values. Slower waves (those having larger slowness values) take longer to reach the more distant receiver elements, and accordingly, their effect on the recorded waveforms is increasingly delayed for larger distances.

To identify waves and their slowness values, the acoustic logging tool may calculate the time semblance E(t,s) as a function of slowness and time for the data. This information in turn may be used to determine various formation properties, including wave propagation velocity and dispersion of acoustic waves. The equation for the time semblance E(t,s) is:

$$E(t,s) = \frac{1}{N} \frac{\left(\sum_{i=1}^{N} x_i(t - sd_i)\right)^2}{\sum_{i=1}^{N} x_i^2(t - sd_i)} \quad (1)$$

In the above equation, N is the number of receiver elements, and hence is also the number of recorded waveforms, $x_i(t)$ is the waveform recorded by the ith receiver, $d_i$ is the distance of the ith receiver from the transmitter, and s is the slowness. In Equation 1, the quantity $(t-sd_i)$ is the relative time at the ith receiver for a given slowness s.

Semblance values E(t,s) range between zero and one. Values near one indicate a high correlation between the various recorded waveforms at the given time and slowness, and hence indicate the presence of a propagating wave having that slowness value. Values near zero indicate little correlation between the various waveforms at the given time and slowness value, and hence provide no indication of a propagating wave having that slowness value.

FIG. 5A shows the time semblance E(t,s) plot for the data in FIG. 5B. Two strong peaks are visible, along with three secondary peaks. The strong peak in the lower left corner corresponds to a compressional wave with the correct slowness (110 µs/ft). The strong peak in the middle of the plot, and the secondary peaks below and to the right of the strong peak, correspond to the shear wave. The correct slowness value (230 µs/ft) is provided by one of the secondary peaks, but the multiplicity and relative strength of the peaks makes it difficult to correctly determine the shear velocity.

Another function that may be useful for analyzing the performance of acoustic logging tools is the phase semblance. The phase semblance E(f,s) is determined as a function of slowness and frequency according to the following equation:

$$E(f, s) = \frac{1}{N} \frac{\left\| \sum_{i=1}^{N} \Phi[X_i(f)e^{-j(2\pi f)sd_i}] \right\|^2}{\sum_{i=1}^{N} \|\Phi[X_i(f)e^{-j(2\pi f)sd_i}]\|^2} \quad (2)$$

In the above equation, N is the number of receivers, and hence is also the number of recorded waveforms, $X_i(f)$ is the Fourier transform of waveform $x_i(t)$, $d_i$ is the distance of the ith receiver from the transmitter, and exponential factor $e^{-j(2\pi f)sd_i}$ is the Fourier transform equivalent of the relative time shift $(t-sd_i)$. $\Phi$ represents the phase operator of the complex number. For a complex number $Ae^{j\theta}$, the phase given by the phase operator is $\Phi[Ae^{j\theta}]=\theta$. (No attempt is made to limit the phase to a range of principal values.)

FIG. 5C shows the phase semblance plot for the data in FIG. 5B. The phase semblance is shown as a function of frequency (in kHz) and slowness (in µs/ft). A general phase semblance relationship is visible between frequency and slowness (sloping downward from left to right), but no clear indication of the shear wave is visible.

FIG. 5D shows a plot of a term in the analytic calculation of the dispersion function as a function of frequency and slowness. The model used for this calculation is axi-symmetric. Standard continuous stress-displacement boundary conditions are used, along with a vanishing shear stress in the fluid. The dispersion function is found by predicting the behavior of the different wave propagation modes as a function of frequency. The techniques for performing these calculations may be found in the following references, which are hereby incorporated herein by reference:

K. M. White, Underground Sound, Elsevier, Amsterdam, 1983

D. P. Schmitt and M. Bouchon, Full wave acoustic logging: synthetic microseismograms and frequency wavenumber analysis, Geophysics, 50, 1756–1778, 1985.

At any given frequency, four peaks are visible. The slowness value (and width) of the peaks varies as a function of frequency. The peaks are indicative of branch cuts and poles in the dispersion function. In general, the effect of the branch cuts on the waveform is negligible compared to that of poles. Two of the peaks represent branch cuts. These are relatively constant at 100 µs/ft and 200 µs/ft, respectively. The bottom-most peak represents wave propagation along the interface between the tool and the borehole fluid, and the top-most peak represents wave propagation along the interface between the borehole fluid and the formation (i.e. the borehole boundary). Most significantly, the propagation slowness of the borehole boundary wave gradually decreases as a function of frequency from 350 µs/ft to about 280 µs/ft. Because the true shear wave propagation slowness is 230 µs/ft, there is little hope for an accurate measurement of the formation shear wave slowness using the monopole source configuration.

FIG. 6B shows the signals received by the receiver elements for the dipole excitation pattern. These signals are the basis for the semblance plot in FIG. 6A and the phase semblance plot in FIG. 6C. The semblance plot in FIG. 6A shows one strong peak at about 800 µs and 150 µs/ft, and three secondary peaks at about (1320 µs, 150 µs/ft), (1900 µs, 250 µs/ft), and (2400 µs, 150 µs/ft), respectively. None of these peaks provides the correct slowness for the formation shear wave.

The phase semblance plot in FIG. 6C shows two clear phase relationships which slope downward from left to right. The lower one is indicative of the tool interface wave, and the upper one is indicative of the borehole interface wave. The presence of both waves in the region of interest may cause one of the interface waves to be obscured by the other, which may complicates measurement procedures.

FIG. 6D shows the analytic term for the dipole excitation pattern. Below 10 kHz, four peaks are apparent. (Additional peaks emerge at higher frequencies, but these are ignored for the present discussion.) As before, two of the peaks have relatively constant slowness values at 100 µs/ft and 200 µs/ft, respectively. The tool interface wave starts at about 230 µs/ft and falls off asymptotically to about 100 µs/ft. The borehole interface wave varies between 300 µs/ft and 280 µs/ft. As before, there is little hope for obtaining an accurate measurement of the formation shear wave slowness from the borehole interface wave.

Figure 7B:
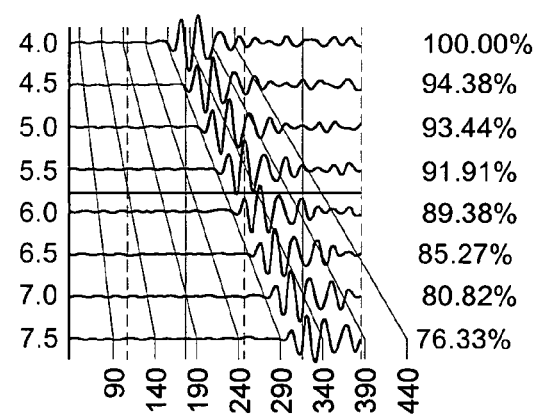

FIG. 7B shows the signals received by the receiver elements for the quadrupole excitation pattern. These signals are the basis for the semblance plot in FIG. 7A and the phase semblance plot in FIG. 7C. The semblance plot shows a single strong peak at 2000 µs and 275 µs/ft, no help is apparent here. The phase semblance plot, however, shows a clear phase relationship between the slowness and the frequency. Significantly, the phase semblance peak has a sharp minimum at 240 µs/ft. Using the quadrupole excitation pattern and the phase semblance plot provides an improved method for determining the formation shear slowness.

Figure 7D:
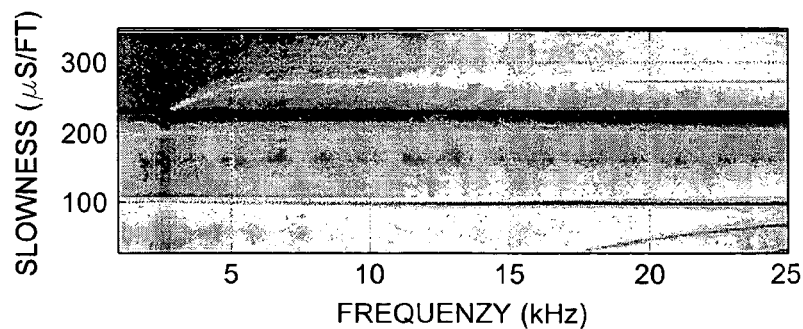

FIG. 7D provides additional support for the use of the quadrupole excitation pattern. The analytic term for calculating dispersion has the familiar four peaks. The peak associated with the borehole interface wave converges to the desired 230 µs/ft at about 2 kHz. For frequencies above 5 kHz, the peak maintains a slowness value of about 280 µs/ft.

From the above discussion, it is clear that the quadrupole source provides more direct results for determining the slow formation shear wave slowness than the monopole and dipole sources. A second substantial benefit of the quadrupole source is that the tool interface wave is absent from the frequency region of interest. This eliminates one potential source of interference with the measurements, and simplifies the formation measurement procedure.

Figure 8:
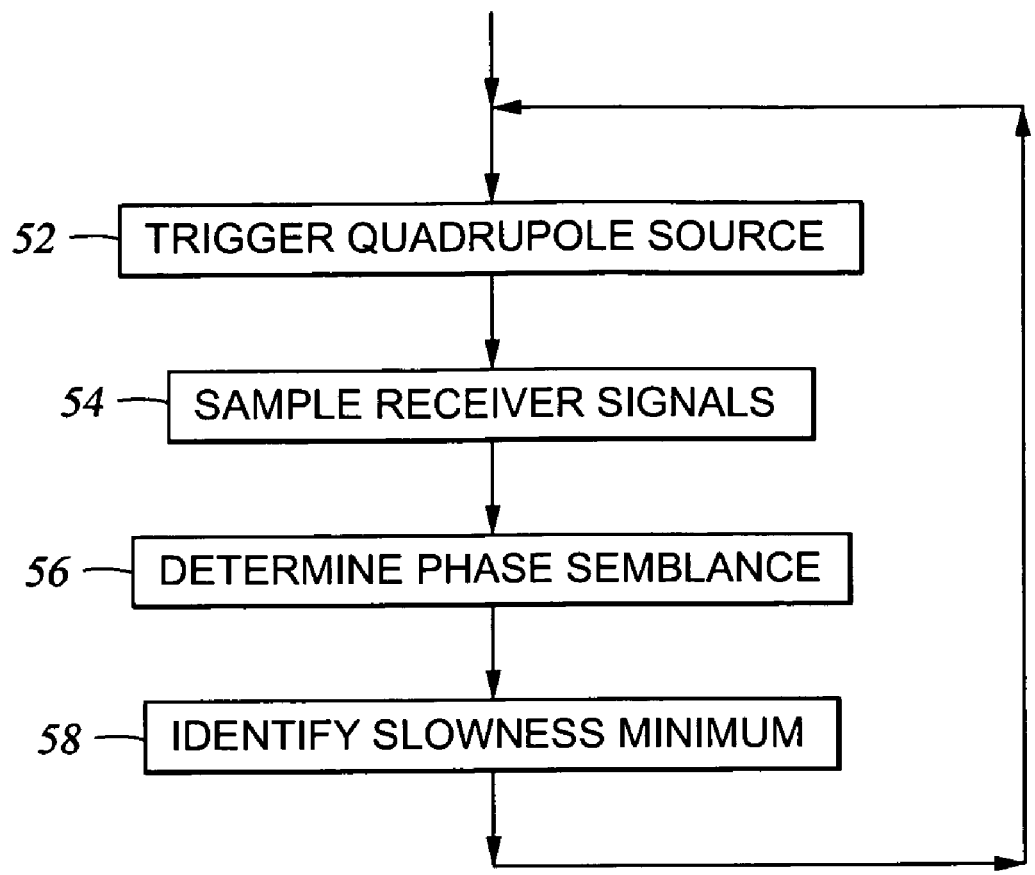
FIG. 8 shows a flowchart of a method for determining shear wave propagation slowness in slow formations.

FIG. 8 shows a flowchart of the improved method for determining formation slowness. In block 52, the internal controller triggers the acoustic source in a quadrupole excitation pattern. In block 54, the internal controller records the signals from the receiver array elements. In block 56, the internal controller calculates the phase semblance as a function of frequency and slowness, and in block 58, the internal controller identifies the minimum slowness value of the phase semblance peak. The internal controller communicates this value to the downhole controller as the formation shear wave slowness.

Numerous variations and modifications will become apparent to those skilled in the art once the above disclosure is fully appreciated. It is intended that the following claims be interpreted to embrace all such variations and modifications.

For example, the present method may be used with any acoustic source that excites wave propagation in the quadrupole mode, although a quadrupole source (i.e. a source that primarily excites the quadrupole mode) is preferred. The receiver configuration may be additionally or alternatively altered (or the receiver signals processed) to enhance the quadrupole mode response and reduce the response to monopole and dipole modes. In one embodiment, the receiver array quadrupole response may be enhanced by determining a combined signal for each set of four receivers in the array. The combined signal may be the sum of inverted signals from two opposing receivers with the signals from the remaining two receivers in the set.

What is claimed is:

1. An acoustic logging tool that comprises:
   an acoustic source configured to excite wave propagation in a quadrupole mode;
   an array of acoustic receivers; and
   an internal controller configured to record signals from each of the acoustic receivers and configured to process the signals to determine a shear wave propagation slowness for a formation surrounding the acoustic logging tool;
   wherein the internal controller is configured to determine a phase semblance as a function of frequency and slowness from the receiver signals.

2. The acoustic logging tool of claim 1, wherein the acoustic source is a quadrupole source.

3. The acoustic logging tool of claim 2, wherein the acoustic source includes four source elements that are equally spaced about the circumference of the logging tool, and wherein opposing elements are excited in-phase, and elements 90° apart are excited in inverse-phase.

4. The acoustic logging tool of claim 3, wherein each source element includes a piezoelectric transducer.

5. The acoustic logging tool of claim 1, wherein the array of acoustic receivers includes a set of four receiver elements at each of a plurality of positions along the longitudinal axis of the logging tool, wherein the receiver elements of each set are equally spaced about the circumference of the logging tool.

6. The acoustic logging tool of claim 5, wherein the acoustic source includes four source elements that are equally spaced about the circumference of the logging tool, and wherein each of the source elements is aligned with a respective one of the receiver elements in each set of receiver elements.

7. The acoustic logging tool of claim 5, wherein the internal controller inverts signals from two opposing receiver elements in each set of receiver elements and combines the inverted signals with signals from the remaining two receiver elements in the set of receiver elements to obtain a combined signal for each set of receiver elements.

8. The acoustic logging tool of claim 7, wherein each of the receiver elements includes a piezoelectric transducer.

9. The acoustic logging tool of claim 1, wherein the internal controller is configured to identify a phase semblance peak associated with each of a plurality of frequencies, and wherein the internal controller is configured to identify a smallest slowness value associated with the phase semblance peak as the shear wave propagation slowness for the formation.

10. The acoustic logging tool of claim 1, wherein the tool is configured for logging while drilling.

11. The acoustic logging tool of claim 1, wherein the source excites waves having frequencies greater than 2 kHz.

12. A method of determining the shear wave propagation slowness of a formation, the method comprising:
   exciting waves that propagate along a borehole in quadrupole mode;
   receiving acoustic signals at each of a plurality of positions along the borehole; and
   calculating, from the acoustic signals, slowness values associated with a peak phase semblance as a function of frequency.

13. The method of claim 12, wherein the peak phase semblance is associated with a borehole interface wave.

14. The method of claim 12, further comprising:
   determining a minimum slowness value associated with the peak phase semblance.

15. The method of claim 14, further comprising:
   providing the minimum slowness value as an estimate of the shear wave propagation slowness.

16. The method of claim 12, further comprising:
   processing the acoustic signals to enhance the quadrupole response of a receiver array before said act of calculating slowness values.

* * * * *